United States Patent [19]

Ellis

[11] Patent Number: 5,719,882
[45] Date of Patent: Feb. 17, 1998

[54] RELIABLE DATAGRAM PACKET DELIVERY FOR SIMPLE NETWORK MANAGEMENT PROTOCOL (SNMP)

[75] Inventor: Michael A. Ellis, Sacramento, Calif.

[73] Assignee: Hewlett-Packard Company, Palo Alto, Calif.

[21] Appl. No.: 874,892

[22] Filed: Apr. 28, 1992

[51] Int. Cl.[6] .................................. H04L 12/433
[52] U.S. Cl. .......................... 371/33; 395/200.67
[58] Field of Search ............................. 395/800, 200, 395/200.67; 370/94.1, 85.1; 364/242.94, 242.95, 242.96, 284.4; 371/33

[56] References Cited

U.S. PATENT DOCUMENTS

| | | | |
|---|---|---|---|
| 4,575,847 | 3/1986 | Fallwell, Jr. et al. | 371/57.2 |
| 4,663,706 | 5/1987 | Allen et al. | 395/200.64 |
| 4,896,289 | 1/1990 | Svinicki et al. | 395/183.1 |
| 4,998,297 | 3/1991 | Irvine-Halliday et al. | 370/407 |
| 5,084,900 | 1/1992 | Taylor | 370/320 |
| 5,195,183 | 3/1993 | Miller et al. | 395/200.61 |

OTHER PUBLICATIONS

Van Jacobsen, "Congestion Avoidance and Control", Computer Communications Review, SIGCOMM '88 Symposium, Stanford CA, ACM Press, Aug. 19, 1988, pp. 314–329.

David Clark, "Window and Acknowledgment Strategy in TCP", ARPANET Working Group Requests for Comment, DDN Network Information Center, SRI International, Menlo Park, CA, Jul. 1982, RFC-813.

Raj Jain, "Divergence of Timeout Algorithms for Packet Retransmissions", Proceedings Fifth Annual International Phoenix Conference on Computers and Communications, Scottsdale, AZ, Mar. 1986, pp. 174–179.

Primary Examiner—Larry D. Donaghue
Assistant Examiner—John Follansbee

[57] ABSTRACT

In a method useful for calculating timeouts for messages sent by a network management system, a first network device stores a retry time and a retry value for each network device in a plurality of network devices. In order to determine when to execute a timeout for a first message sent from the first network device to a second network device which is in the plurality of network devices, the retry time and the retry value for the second network device are used. While a response to the first message is not received by the first network device from the second network device, the first message from the first network device to the second network device is resent a number of times equal to the retry value for the second network device. The elapsed time between each resending of the first message is equal to the retry value for the second network device. When a response to the first message is still not received by the first network device, a timeout is executed. The first network device adjusts the retry value and the retry number for each network device as responses are received from the network device or timeouts are executed.

16 Claims, 5 Drawing Sheets

RELIABLE DATAGRAM PACKET DELIVERY FOR SIMPLE NETWORK MANAGEMENT PROTOCOL (SNMP)

BACKGROUND

The present invention concerns setting timeouts and retry numbers for communication between network devices on an unreliable datagram network service.

When network devices communicate across complex networks, it is necessary to confirm that data packets which are sent across the network arrive to their destination in an uncorrupted condition.

Most complex networks operate using several levels of protocol, each operating on a different layer of the network. For example, complex networks operating according to ISO OSI standard architecture include a physical layer, a link layer, a network layer and a transport layer. See, Proceedings of the IEEE, Volume 71, No. 12, December 1983.

At the transport level, the use of timeouts and the consequent estimation of round trip times for data packets are used to increase the overall bandwidth of the network while maintaining a reasonable rate of information flow between network devices. Various algorithms have been suggested to determine a timeout strategy at the transport level. See for example, David Clark, *Window and Acknowledgment Strategy in TCP*, ARPANET Working Group Requests for Comment, DDN Network Information Center, SRI International, Menlo Park, Calif., July 1982, RFC-813; Raj Jain, *Divergence of Timeout Algorithms for Packet Retransmissions*, Proceedings Fifth Annual International Phoenix Conference on Computers and Communications, Scottsdale, Ariz., March 1986; and Van Jacobsen, *Congestion Avoidance and Control*, Computer Communications Review, SIGCOMM '88 Symposium, Stanford Calif., ACM Press, Aug. 19, 1988.

In the prior art, the focus has been to increase overall network performance without imposing too heavy a burden on data packet throughput between any two network devices. Consequently, the algorithms used in the prior art attempt to closely predict the actual time fluctuations of the window delay inherent in the receipt of acknowledgments of data packets. Thus these algorithms tend to statistically predict future round trip times based on use of a mean or standard deviation. While these algorithms have proved satisfactory for use in a transport protocol, they are less well adapted for use by a network management system, operating without a transport protocol, in which reliability of data packet transmission is more important than throughput considerations.

SUMMARY OF THE INVENTION

In accordance with the preferred embodiment of the present invention, a method is provided in a network system having a first network device and a plurality of network devices. The first network device stores a retry time and a retry value for each network device in the plurality of network devices. In order to determine when to execute a timeout for a first message sent from the first network device to a second network device which is in the plurality of network devices, the retry time and the retry value for the second network device are used. While a response to the first message is not received by the first network device from the second network device, the first message from the first network device to the second network device is resent a number of times equal to the retry value for the second network device. The elapsed time between each resending of the first message is equal to the retry value for the second network device. When a response to the first message is still not received by the first network device, a timeout is executed.

The first network device adjusts the retry value and the retry number for each network device as responses are received from the network device or timeouts are executed. For example, when the first network device receives a response to the first message by the first network device, the first network device adjusts the retry time for the second network device based on a first response time which elapsed between the first network device sending the first message and the first network device receiving from the second network device the response to the first message. For instance, when the first response time is a maximum for response times for messages sent from the first network device to the second network device, the retry time for the second network device is set equal to an amount greater than the first response time. When the first response time is not a maximum for response times for messages sent from the first network device to the second network device, the retry time for the second network device is set equal to a weighted average of the current retry time and the first response time. Specifically, in the preferred embodiment, when the first response time is a maximum for response times for messages sent from the first network device to the second network device, the retry time for the second network device is set to an amount equal to twice the first response time. When the first response time is not a maximum for response times for messages sent from the first network device to the second network device, retry time (RETRYTIME) is adjusted based on the first response time (RESPONSETIME) using the following formula:

$$RETRYTIME=2*(99*RETRYTIME/2+RESPONSETIME)/100.$$

The retry value is increased whenever a timeout occurs. Likewise the retry value for the second network device is decreased upon the first network device receiving a response to each of a first number of messages sent from the first network device to the second network device. For example, in the preferred embodiment, the retry value for the second network device is increased by 1 upon execution of a timeout to the first message, and the retry value for the second network device is decremented upon the first network device receiving a response to each of 1000 messages sent from the first network device to the second network device.

Additionally, in the preferred embodiment, upon receipt of a response to a message to a certain network device after execution of a timeout, the retry time and the retry value for that network device are increased. For example, the retry time may be increased by two and retry value may be doubled.

In additional to the variables necessary to calculate the retry time and retry value for each network device, the first network device may also store other statistics pertaining to responses from the network devices. For example, additional statistics for each network device may include an average response time, a total number of messages sent to the network device, a total number of responses received from the network device, a number of retries to the network device, a number of timeouts for the network device, and a number of consecutive successful responses or consecutive timeouts for the network device.

The present invention is particularly advantageous when used with a network management system. In a network management system, reliable data packet transmission is the preeminent concern, and throughput is of only nominal concern. In the present invention, past response times are used to assure the likelihood that the first network device (i.e., the network management system) will be able to efficiently contact each of the network devices. This is particularly important to network manager systems which use the Simple Network Management Protocol (SNMP) as SNMP does not use a transport protocol. Also, the method of the present invention provides for retry values and retry times to be calculated for each network device over a period in which several messages are sent and responses received. This allows for optimization of the retry value and retry time for each network device using a reasonably large sample size.

DESCRIPTION OF THE PREFERRED EMBODIMENT

Figure 1:
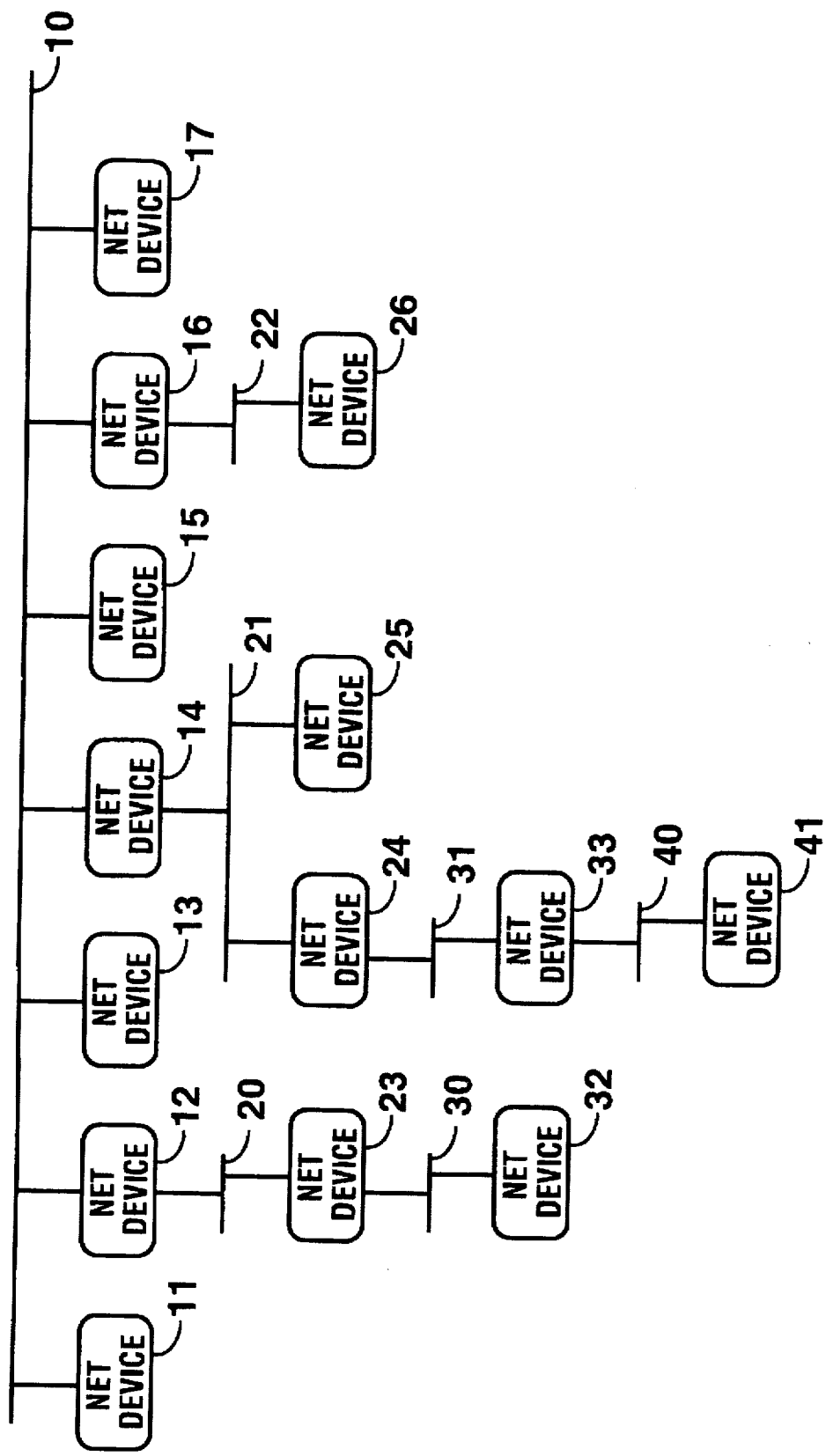
FIG. 1 shows an overview of a network devices connected together into a complex network.

FIG. 1 shows a simplified network diagram of network devices connected in a complex network. A network device 11, a network device 12, a network device 13, a network device 14, a network device 15, a network device 16 and a network device 17 are shown connected to a network segment 10. Network device 12 and a network device 23 are shown connected to a network segment 20. Network device 14, a network device 24 and a network device 25 are shown connected to a network segment 21. Network device 16 and a network device 26 are shown connected to a network segment 22. Network device 23 and a network device 32 are shown connected to a network segment 30. Network device 24 and a network device 33 are shown connected to a network segment 31. Network device 33 and a network device 41 are shown connected to a network segment 40. Each of these network devices may be, for example, a network hub.

Network device 12, network device 14, network device 16, network device 23, network device 24, network device 26 and network device 33 are each shown to be connected to more than one network segment. Each of these network devices may function as, for example, a network bridge or a network router.

To insure optimum performance throughout the network shown in FIG. 1, it is desirable to monitor operation. Such monitoring includes creating a map of network devices connected to a network. This ability to detect network devices across a network has been discussed and a solution provided. See for example U.S. patent application Ser. No. 07/693,980, by Chuck A. Black for *Determining Physical Topology Across Repeaters and Bridges in a Computer Network*, which is hereby incorporated by reference. For a general discussion of Network Management, see, for example, *Network Management Reference Document*, 1991, available from Hewlett Packard Company, having a business address of 3000 Hanover Street, Palo Alto, Calif. 94304.

Figure 2:
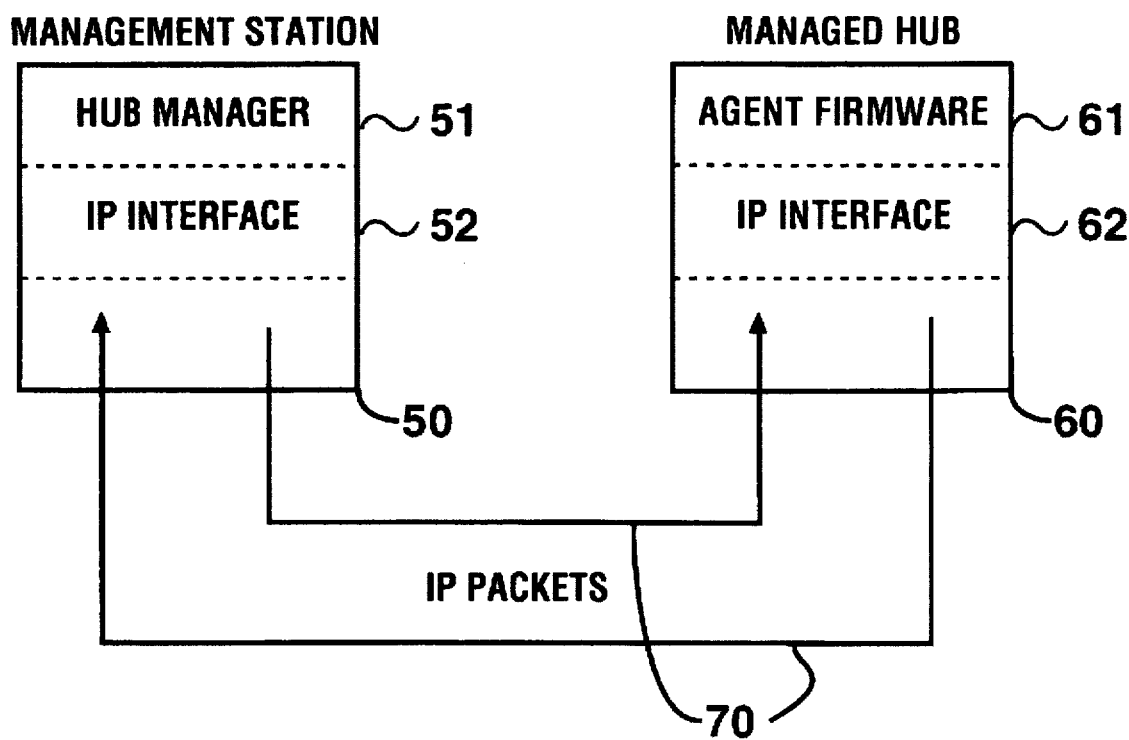
FIG. 2 is a simplified block diagram which shows the flow of data packets between a management station and a managed hub in a network in accordance with the preferred embodiment of the present invention.

FIG. 2 shows a simplified flow diagram of data packets between a management station 50 and managed hub 60 of a network. Management station 50 can be any of the network devices shown in FIG. 1 which runs management network software. For example, the management network software may be embodied as a hub manager 51 shown in FIG. 2. Hub manager 51, sends out separate data packets to obtain information from each managed hub.

In the preferred embodiment of the present invention, hub manager 50 implements the simple network management protocol (SNMP). This SNMP specifies an ASN.1 protocol, which operates over an internet protocol (IP). See generally Information Processing Systems-Open Systems Interconnection-Specification of Abstract Syntax Notation One (ASN.1), ISO 8824:1987. IP interface 52 implements the (IP). For further information on SNMP, see *Network Management Reference Document*, 1991, available from Hewlett Packard Company. For further information on the IP, see the Request For Comments (RFC) 777 and 792 issued by the Internet Activities Board.

Using IP data packets, sent through an IP Packet data path 70, hub manager 51 communicates with agent firmware 61 within a managed hub 60. Agent firmware 61 receives data packets from, and sends data packets to, hub manager 51 through an IP interface 62. By using IP, hub manager 51 and agent firmware 61 can communicate even across router boundaries.

Since hub manager 51 uses SNMP rather than a standard transport protocol such as Transmission Control Protocol (TCP), network management data packets are sent and received using an unreliable datagram network service. See RFC 793, RFC 761, and RFC 675, issued by the Internet Activities Board. While this simplifies implementation of SNMP, it allows for no guaranteed delivery mechanism for network management data packets. Thus hub manager 51 must make decisions as to how it will handle a delayed acknowledgment or a failure to acknowledge a network management data packet by one of the managed hubs.

When hub manager 51 does not receive an acknowledgment of a network management data packet, hub manager 51 will wait a certain amount of time, and then retry by sending another network management data packet. After a certain number of retries, hub manager 51 will record a timeout and presume the unresponsive network device is presently not available. In order to assure optimal performance, hub manager 51 must carefully select an optimal time to wait before initiating a retry, and perform an optimal number of retries. If hub manager 51 records a timeout too quickly, it will render ineffective the management of the network by hub manager 51. Since the ability to manage a network, especially during times of network duress, is the main reason for the existence of hub manager 51, this condition is unacceptable. On the other hand, if hub manager 51 waits too long before recording a timeout, the perceived performance of hub manager 51 by a user will quickly degrade when only a few network devices stop responding to hub manager 51.

Because of the above-discussed restraints, algorithms which closely predict the actual time fluctuations of the window delay inherent in the receipt of acknowledgments of data packets, such as those used in a typical transport level, are not optimal for the present application. Instead, the method which controls generating the timeout must provide a reasonable tradeoff between timing out too early and waiting too long in order to assure that the management function of hub manager 51 may be acceptably accomplished.

In order to select an optimal time to wait before initiating a retry, and to perform an optimal number of retries, hub manager 51, keeps statistics regarding each network device, and uses these statistics to calculate when to retry and when to timeout. This use of statistics allows the calculation of an acceptable length of time between retries and a number of times before timeout.

Figure 3:
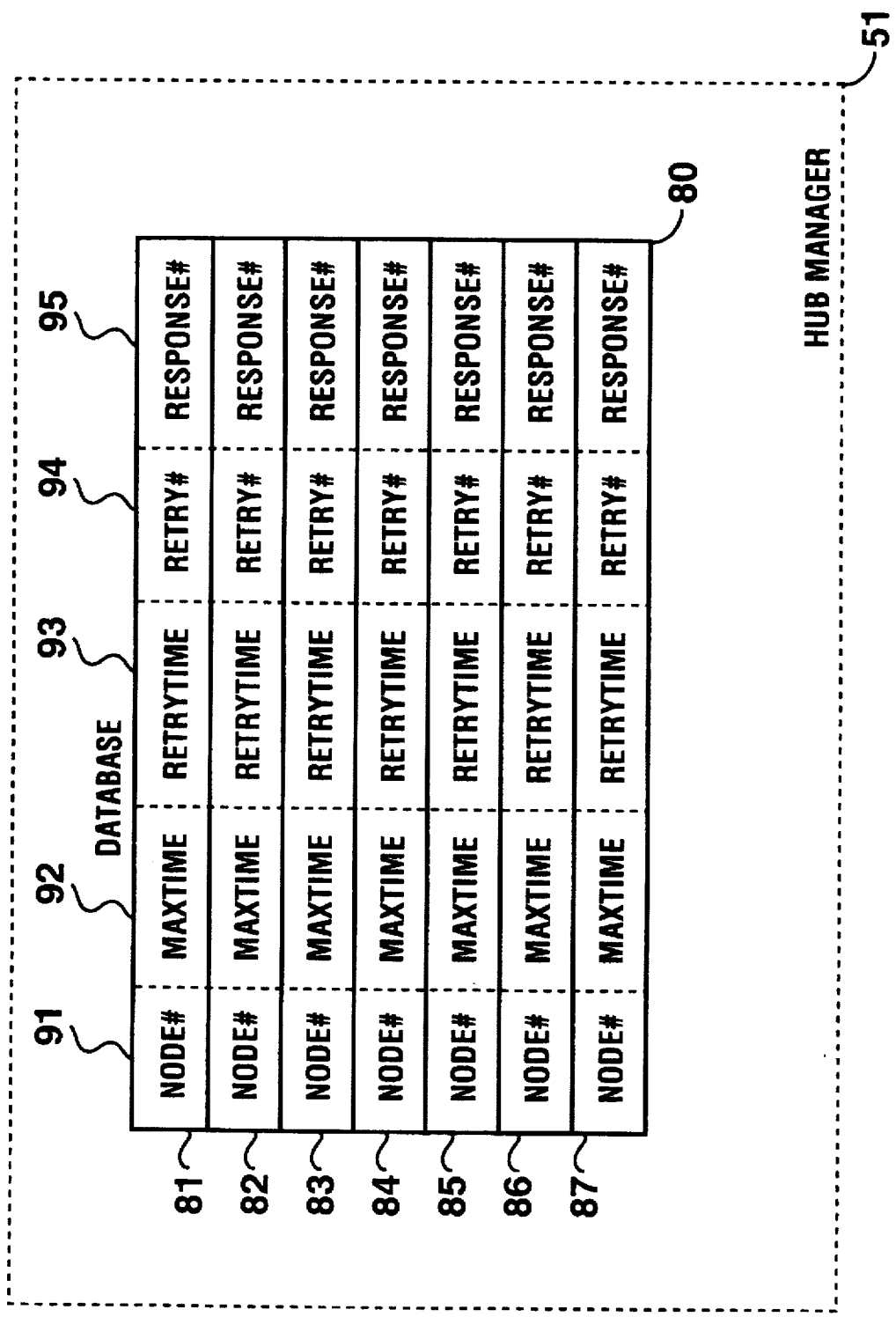
FIG. 3 shows a table within a hub manager which is used to store response time variables used for each managed network device in accordance with the preferred embodiment of the present invention.

FIG. 3 shows a database 80, within hub manager 51, which may be used to store statistical information. In FIG. 3, database 80 is shown arranged as a table; however, the data within the database may be stored in variety of manners, as is understood by persons of ordinary skill in the art. In each of the rows of table 81, information for a single network device is stored. For example, shown in FIG. 3 are a row 81, a row 82, a row 83, a row 84, a row 85, a row 86 and a row 87.

In each row, for each network device, various statistics and other variables are stored. For example, as shown in FIG. 3, in a column 91, the address of each network device (NODE#) is stored. In a column 92, the maximum response time (MAXTIME) for each network device is stored. The maximum response time is measured from the time a message is sent to a network device until the time a response is received from the network device. In a column 93, for each network device, the currently calculated time used between retries (RETRYTIME) is stored. In a column 94, for each network device, the currently determined number of retries to be made before timing out (RETRY#) is stored. In a column 95, for each network device, a counter (RESPONSE#) is stored which keeps track of successful responses from the network device.

In addition to those statistics and variables shown in FIG. 3, additional statistics and variables may be stored for each network device. These statistics and variables can be made available to a user, or be used by hub manager 51 for various other purposes. For example, in the preferred embodiment of the present invention, for each network device hub manager 51 additionally stores the average response time for the network device (AVGRSPTIME), the total number of messages sent to the network device (SENDS), the total number of responses received from the network device (RECEIVES), the number of retries to the network device (RETRIES), the number of timeouts for the network device (TIMEOUTS), the number of consecutive successful responses or consecutive timeouts for the network device (CONSECSUCCESSES), and whether the status of the network device is known (STATUSKNOWN).

Figure 4:
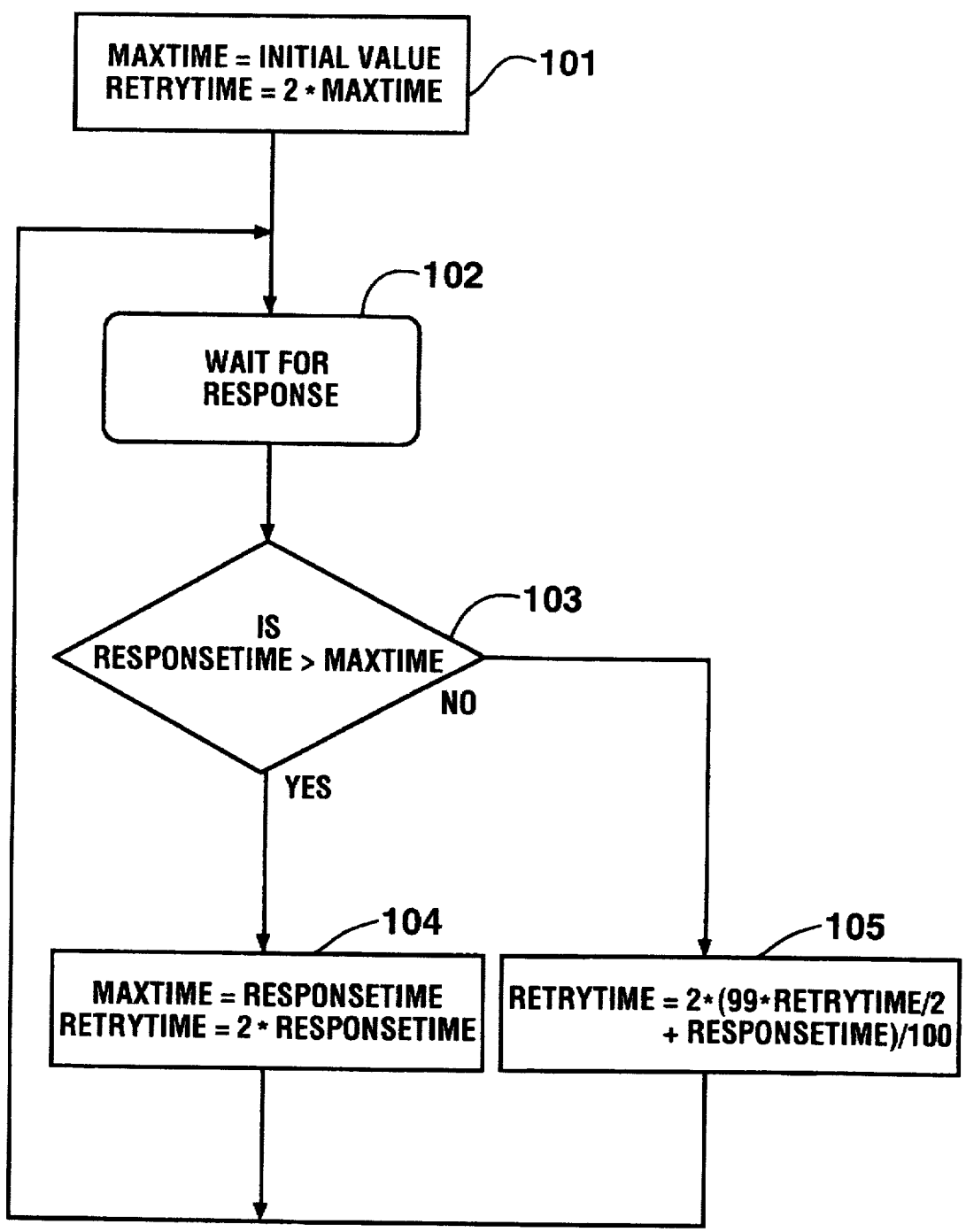
FIG. 4 shows a simplified flowchart which describes calculation of the time between retries for each network device in accordance with the preferred embodiment of the present invention.

The flowchart in FIG. 4 illustrates how hub manager 51 calculates the time between retries (RETRYTIME) for each network device. Initially, as shown in a step 101, the maximum response time (MAXTIME) is set to some initial value. For example, the initial value may be three seconds. RETRYTIME is initialized to twice the value of MAXTIME.

After initialization, in a step 102, hub manager 51 waits until a message has been sent to the network device and a response received. When a message has been sent to the network device and a response received, in a step 103, hub manager 51 checks to see whether the elapsed time between sending a message and receiving a response (RESPONSETIME) is greater than the stored value of MAXTIME. RESPONSETIME time is measured from the last retry sent. If so, in a step 104, MAXTIME is set to RESPONSETIME and RETRYTIME is set to twice RESPONSETIME. If not, in a step 105, RETRYTIME is set to a weighted average of RETRYTIME and RESPONSETIME. In the preferred embodiment, the average is weighted so that RETRYTIME is given by the following formula:

RETRYTIME=2*(99*RETRYTIME/2+RESPONSETIME)/100

After completion of step 104 or step 105, hub manager 51 waits for the next response, in step 102, before making additional modifications to RETRYTIME.

In the above described method for calculating RETRYTIME, whenever RESPONSETIME is a maximum, RETRYTIME is set to twice RESPONSETIME. After that time, this maximum value of RETRYTIME is slowly backed off using a weighted average. This method of calculating RETRYTIME is designed to assure that a timeout does not occur before any response is received, and is not optimized for throughput as are the prior art algorithms.

Figure 5:
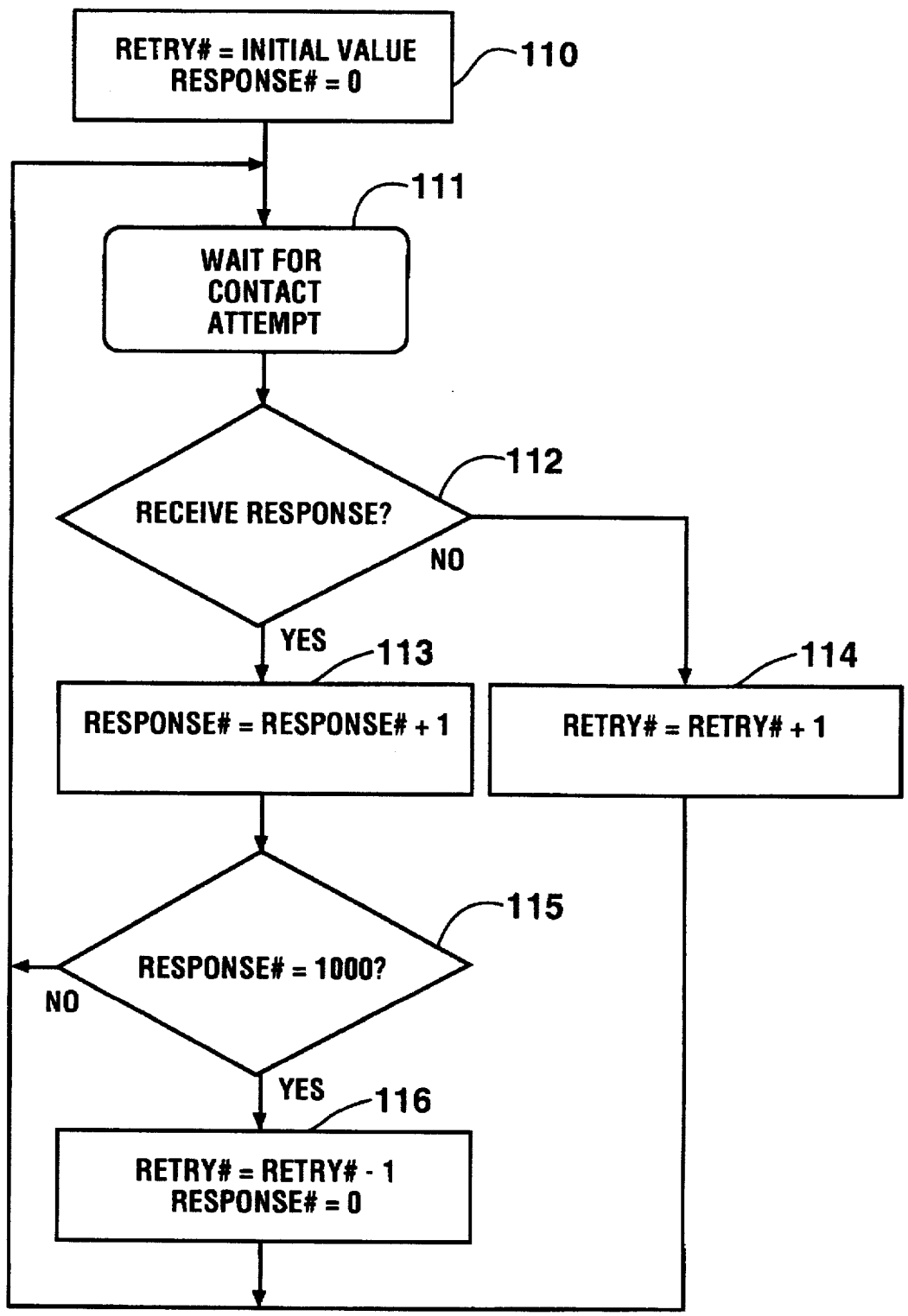
FIG. 5 shows a simplified flowchart which describes calculation of the number of retries for each network device in accordance with the preferred embodiment of the present invention.

The flowchart in FIG. 5 illustrates how hub manager 51, for each network device, calculates the number of retries (RETRY#) to be made before timing out. Initially, as shown in a step 110, hub manager 51 initializes RETRY# to some initial value. For example, this initial value may be three. Also in step 110, a counter (RESPONSE#) is set to 0.

After initialization, in a step 111, hub manager 51 waits for an attempted contact of the network device. Once a contact has been attempted, in a step 112, hub manger 41 waits for a response from the network device. If there is no response and a timeout occurs. When a timeout occurs, in a step 114, RETRY# is incremented and hub manager 51 waits for the next contact attempt, in step 111, before making further adjustments to RETRY#. If a response is received, in a step 113, the counter RESPONSE# is incremented. In a step 115, the value of counter RESPONSE# is checked. If RESPONSE# does not equal 1000, hub manager 51 returns to step 111 and waits for another contact attempt before making further adjustments to RETRY#. If RESPONSE# equals 1000, in a step 116, RETRY # is decremented and the counter RESPONSE# is cleared. Then hub manager 51 returns to step 111 and waits for another contact attempt before making further adjustments to RETRY#.

In general, the present method, where the number of retries is increased for every timeout, is effective for applications such as a network management system. While the method can result in an increase in the number of data packets used per timeout, in a network management system the number of data packets is quite small. Gradually increasing the number of retries when a network device does not respond has the advantage of reliably handling the case of a sporadic link. A sporadic link is one which usually has a very small delay time (e.g. 100 mS), but may on occasion have delays of 2 minutes or longer. The present method is especially effective when sporadic long delay is the result of data packets being lost.

Occasionally, after timeout, a response from a network device may be received. Such a response can be ignored; however, this could impair the ability of the network manager to manage the network device. In the preferred embodiment, when such a late response is heard from a network device, the network device value of RETRYTIME is doubled and RETRY# is incremented twice. This should help prevent a future timeout when the network device is contacted.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. In a network system having a plurality of network devices, a method comprising the steps of:
   (a) sending a first message from a first network device to a second network device;
   (b) while a response to the first message is not received by the first network device from the second network device, resending the first message from the first network device to the second network device a number of times equal to a retry value, an elapsed time between each resending of the first message being equal to a retry time;
   (c) when, after the completion of step (b), a response to the first message is still not received by the first network device from the second network device, executing a timeout;
   (d) upon executing a timeout in step (c), increasing the retry value; and,
   (e) decreasing the retry value upon the first network device receiving a response to each of a first number of messages sent from the first network device to the second network device.

2. A method as in claim 1 wherein in step (d) the retry value is increased by 1, and in step (e) the retry value is decremented upon the first network device receiving a response to each of 1000 messages sent from the first network device to the second network device.

3. In a network system having a plurality of network devices, a method comprising the steps of:
   (a) sending a first message from a first network device to a second network device;
   (b) while a response to the first message is not received by the first network device from the second network device, resending the first message from the first network device to the second network device a number of times equal to a retry value, an elapsed time between each resending of the first message being equal to a retry time;
   (c) when, after the completion of step (b), a response to the first message is still not received by the first network device from the second network device, executing a timeout;
   (d) upon executing a timeout in step (c), increasing the retry value; and,
   (e) upon receipt of a response to the first message, adjusting the retry time based on a first response time which elapsed between the first network device sending the first message and the first network device receiving from the second network device a response to the first message, wherein step (e) includes the following substeps:
      (e.1) when the first response time is a maximum for response times for messages sent from the first network device to the second network device, setting the retry time equal to twice the first response time, and
      (e.2) when the first response time is not a maximum for response times for messages sent from the first network device to the second network device, setting the retry time equal to a weighted average of the current retry time and the first response time.

4. A method as in claim 3 wherein in step (e.2) the retry time (RETRYTIME) is adjusted based on the first response time (RESPONSETIME) using the following formula:

RETRYTIME=2*(99*RETRYTIME/2+RESPONSETIME)/100.

5. A method as in claim 3 additionally comprising the step of:
   (f) decreasing the retry value upon the first network device receiving a response to each of a first number of messages sent from the first network device to the second network device.

6. A method as in claim 5 wherein in step (d) the retry value is increased by 1, and in step (f) the retry value is decremented upon the first network device receiving a response to each of 1000 messages sent from the first network device to the second network device.

7. In a network system having a first network device and a plurality of network devices, a method comprising the steps of:
   (a) storing, by the first network device, a retry time and a retry value for each network device in the plurality of network devices;
   (b) using a retry time for a second network device and a retry value for the second network device, the second network device being in the plurality of network devices, to determine when to execute a timeout for a first message sent from the first network device to the second network device, as set out in the following substeps:
      (b.1) while a response to the first message is not received by the first network device from the second network device, resending the first message from the first network device to the second network device a number of times equal to the retry value for the second network device, a length of time between each resending of the first message being equal to the retry time for the second network device;
      (b.2) when, after the completion of substep (b.1), a response to the first message is still not received by the first network device from the second network device, executing a timeout; and,
   (c) upon receipt by the first network device of a response to the first message before execution of a timeout in step (b.2), adjusting the retry time for the second network device based on a first response time which elapsed between the first network device sending the first message and the first network device receiving from the second network device the response to the first message, the adjusting including the following substeps:
      (c.1) when the first response time is a maximum for response times for messages sent from the first network device to the second network device, setting the retry time for the second network device equal to an amount greater than the first response time, and
      (c.2) when the first response time is not a maximum for response times for messages sent from the first network device to the second network device, setting the retry time for the second network device equal to a weighted average of the current retry time and the first response time.

8. A method as in claim 7 wherein in substep (c.1) the retry time for the second network device is set to an amount equal to twice the first response time, and in substep (c.2) the retry time (RETRYTIME) is adjusted based on the first response time (RESPONSETIME) using the following formula:

$$RETRYTIME=2*(99*RETRYTIME/2+RESPONSETIME)/100.$$

9. A method as in claim 7 additionally comprising the step of:

(d) upon executing a timeout in substep (b.2), increasing the retry value for the second network device.

10. A method as in claim 9 wherein in step (d) the retry value for the second network device is increased by 1.

11. A method as in claim 9 additionally comprising the step of:

(e) decreasing the retry value for the second network device upon the first network device receiving a response to each of a first number of messages sent from the first network device to the second network device.

12. A method as in claim 11 wherein in step (d) the retry value for the second network device is increased by 1, and in step (e) the retry value for the second network device is decremented upon the first network device receiving a response to each of 1000 messages sent from the first network device to the second network device.

13. A method as in claim 12 wherein in substep (c.1) the retry time for the second network device is set to an amount equal to twice the first response time, and in substep (c.2) the retry time (RETRYTIME) is adjusted based on the first response time (RESPONSETIME) using the following formula:

$$RETRYTIME=2*(99*RETRYTIME/2+RESPONSETIME)/100.$$

14. A method as in claim 7 wherein step (a) additionally includes storing by the first network device for each network device, an average response time, a total number of messages sent to the network device, a total number of responses received from the network device, a number of retries to the network device, a number of timeouts for the network device, and a number of consecutive successful responses or consecutive timeouts for the network device.

15. A method as in claim 7 additionally comprising the following step:

(d) upon receipt of a response to the first message by the first network device after execution of a timeout in step (b.2), increasing the retry time for the second network device and increasing the retry value for the second network device.

16. A method as in claim 15 wherein in step (d) the retry time for the second network device is increased by two and retry value for the second network device is doubled.

* * * * *